(12) United States Patent
Ogyu et al.

(10) Patent No.: US 8,617,476 B2
(45) Date of Patent: Dec. 31, 2013

(54) HONEYCOMB FILTER AND UREA SCR DEVICE

(75) Inventors: Kazutake Ogyu, Ibi-gun (JP); Toyoki Ogasawara, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 12/781,793

(22) Filed: May 17, 2010

(65) Prior Publication Data

US 2011/0085942 A1    Apr. 14, 2011

(30) Foreign Application Priority Data

Oct. 9, 2009    (JP) .................... PCT/JP2009/067671

(51) Int. Cl.
*B01D 50/00* (2006.01)

(52) U.S. Cl.
USPC ........................................................ 422/180

(58) Field of Classification Search
USPC ................................ 422/168, 177, 180; 55/523
See application file for complete search history.

(56) References Cited

U.S. PATENT DOCUMENTS

| 4,867,954 | A | * | 9/1989 | Staniulis et al. | 423/239.1 |
| 5,589,147 | A | * | 12/1996 | Farnos et al. | 423/239.2 |
| 2004/0022699 | A1 | | 2/2004 | Fukushima | |
| 2006/0068159 | A1 | * | 3/2006 | Komori et al. | 428/116 |
| 2007/0129236 | A1 | * | 6/2007 | Liu et al. | 502/74 |
| 2008/0045405 | A1 | | 2/2008 | Beutel et al. | |
| 2008/0085394 | A1 | | 4/2008 | Ohno et al. | |
| 2009/0143221 | A1 | | 6/2009 | Ogunwumi et al. | |
| 2010/0290963 | A1 | * | 11/2010 | Andersen et al. | 423/213.2 |

FOREIGN PATENT DOCUMENTS

| EP | 1419816 | 5/2004 |
| EP | 1440722 | 7/2004 |
| EP | 1452702 A2 * | 9/2004 |
| EP | 1491249 | 12/2004 |
| EP | 1514588 | 3/2005 |
| EP | 1568406 | 8/2005 |
| EP | 1676620 | 7/2006 |
| EP | 1676621 | 7/2006 |
| EP | 1920838 | 5/2008 |
| EP | 1935489 | 6/2008 |
| EP | 1967265 | 9/2008 |
| EP | 1974791 | 10/2008 |
| EP | 1982767 | 10/2008 |
| EP | 1995226 | 11/2008 |

(Continued)

OTHER PUBLICATIONS

Extended European Search Report for corresponding EP Application No. 10156879.8, Jul. 30, 2010.

(Continued)

*Primary Examiner* — Tom Duong

(74) *Attorney, Agent, or Firm* — Ditthavong Mori & Steiner, P.C.

(57) ABSTRACT

A honeycomb filter includes a honeycomb structure and a zeolite. The honeycomb structure includes cell walls having a porosity of about 55% to about 65% and extending along a longitudinal direction of the honeycomb structure to define cells between the cell walls. Each of the cells is sealed at either end of the cells. The zeolite is supported on the cell walls of the honeycomb structure. An amount of the zeolite supported on the cell walls is from about 80 g/L to about 150 g/L. A thermal conductivity of the cell walls supporting the zeolite is about 3 W/mK or more.

40 Claims, 3 Drawing Sheets

(56) References Cited

FOREIGN PATENT DOCUMENTS

| | | |
|---|---|---|
| EP | 2006261 | 12/2008 |
| EP | 2130592 | 12/2009 |
| EP | 2147722 | 1/2010 |
| JP | 1-151706 | 6/1989 |
| JP | 6-182157 | 7/1994 |
| JP | 2002-089247 | 3/2002 |
| JP | 2003-033664 | 2/2003 |
| JP | 2004-016931 | 1/2004 |
| JP | 2005-125209 | 5/2005 |
| JP | 2005-270969 | 10/2005 |
| JP | 2005-299520 | 10/2005 |
| JP | 2007-501353 | 1/2007 |
| JP | 2007-517645 | 7/2007 |
| JP | 2007-296514 | 11/2007 |
| JP | 2008-272737 | 11/2008 |
| JP | 2009-515680 | 4/2009 |
| JP | 2009-262076 | 11/2009 |
| JP | 2011-515309 | 5/2011 |
| WO | WO 02/38922 | 5/2002 |
| WO | WO 03/080219 | 10/2003 |
| WO | WO 2005/002709 | 1/2005 |
| WO | WO 2005/016497 | 2/2005 |
| WO | WO 2005/084806 | 9/2005 |
| WO | WO 2005/099867 | 10/2005 |
| WO | WO 2007/026803 | 3/2007 |
| WO | WO 2007/026806 | 3/2007 |
| WO | WO 2007/074808 | 7/2007 |
| WO | WO 2007/091688 | 8/2007 |
| WO | WO 2007/097161 | 8/2007 |
| WO | WO 2007/097162 | 8/2007 |
| WO | WO 2009/108362 | 9/2009 |

OTHER PUBLICATIONS

International Search Report for corresponding International Application No. PCT/JP2009/067671, Feb. 9, 2010.

"Measurement methods of thermal diffusivity, specific heat capacity, and thermal conductivity for fine ceramics by flash method", Japanese Industrial Standard, JIS R 1611 Japanese Standards Association, 2010.

Wissenschaftliche Berichte FKZA 6317 "Tailored Porosity Gradient by FEM Calculations for Silicon Carbide Evaporator Tubes". Forschungszentrum Karlsruhe GmbH, Karlsruhe 1999.

The Notice of Opposition againt corresponding EP Patent No. 2319604, Feb. 12, 2013.

"Silicon Carbide-Properties," Ullmann's Encyclopedia of Industrial Chemistry, 2002, Electronic Release, Sixth Edition.

* cited by examiner

A-A line cross-sectional view

B-B line cross-sectional view

HONEYCOMB FILTER AND UREA SCR DEVICE

CROSS-REFERENCE TO RELATED APPLICATIONS

The present application claims priority under 35 U.S.C. §119 to International Application No. PCT/JP2009/067671 filed on Oct. 9, 2009, the contents of which are incorporated herein by reference in their entirety.

BACKGROUND OF THE INVENTION

1. Field of the Invention

The present invention relates to a honeycomb filter and a urea SCR device.

2. Discussion of the Background

Toxic gases such as NOx contained in exhaust gases discharged from internal combustion engines, for example, vehicles such as buses and tracks, construction machines, and the like, and particulate matter (hereinafter, also referred to simply as "PM") have raised problems as contaminants harmful to the environment and the human body.

In order to solve the above problems, there has been developed a urea SCR (Selective Catalytic Reduction) device including, as a main component, a honeycomb structure (hereinafter also referred to as catalyst carrier) in which a NOx conversion catalyst is supported for converting NOx in exhaust gases (for example, WO02/38922A1).

The urea SCR device includes a catalyst carrier, a holding sealing material which is wound around the periphery of the catalyst carrier for supporting the catalyst carrier, and a casing for placing therein the catalyst carrier and the holding sealing material. The urea SCR device also includes a urea spray nozzle for spraying urea water disposed anterior to the region through which exhaust gases flow into the catalyst carrier (at an upstream side of exhaust gases).

The catalyst carrier has a pillar shape and is made of a porous ceramic. Also, the catalyst carrier has a large number of cells placed in parallel with one another each extending in a longitudinal direction from one end to the other end of the catalyst carrier with a cell wall interposed therebetween. The cell wall supports a zeolite as a NOx conversion catalyst. The ends of the cells are not sealed with a sealing material, and thus each cell is penetrating from one end to the other end of the catalyst carrier.

In conversion of toxic gases with the use of the urea SCR device, urea water is sprayed to the catalyst carrier. This causes thermal decomposition of the urea contained in the urea water by the heat of the exhaust gases to generate ammonia.

When exhaust gases containing NOx are introduced to the cells from one end of the catalyst carrier, NOx in the exhaust gases is reduced to $N_2$ by the effect of the zeolite supported on the cell wall and the ammonia and thus converted.

The exhaust gases in which NOx has been converted are discharged from the other end side of the catalyst carrier.

On the other hands, in order to purify PM in exhaust gases, a various kinds of honeycomb structures (diesel particulate filter (hereinafter also referred to simply as DPF)) in which either one end of each cell is sealed have been proposed (for example, JP-A 2008-272737).

The DPF has a pillar shape and is made of a porous ceramic. Also, in the DPF, a large number of cells are placed in parallel with one another each extending in a longitudinal direction from one end to the other end of the DPF with a cell wall interposed therebetween. Either one end of each cell is sealed with a sealing material.

Therefore, exhaust gases flowing into the cells which are open on one end pass through the cell walls between the adjacent cells, and are then discharged from the cells which are open on the other end. As the exhaust gases pass through the cell walls, PM contained in the exhaust gases is captured by the cell walls so that the exhaust gases are purified.

When the captured PM is accumulated to a predetermined amount and thus the pressure loss reached a given value, a regeneration process for heating a DPF is performed. As a result, PM is burned away and the DPF is regenerated.

The contents of WO02/38922A1 and JP-A 2008-272737 are incorporated herein by reference in their entirety.

SUMMARY OF THE INVENTION

According to one aspect of the present invention, a honeycomb filter includes a honeycomb structure and a zeolite. The honeycomb structure includes cell walls having a porosity of about 55% to about 65% and extending along a longitudinal direction of the honeycomb structure to define cells between the cell walls. Each of the cells is sealed at either end of the cells. The zeolite is supported on the cell walls of the honeycomb structure. An amount of the zeolite supported on the cell walls is from about 80 g/L to about 150 g/L. A thermal conductivity of the cell walls supporting the zeolite is about 3 W/mK or more.

According to another aspect of the present invention, a urea SCR device includes a honeycomb filter placed in a casing. The honeycomb filter includes a honeycomb structure and a zeolite. The honeycomb structure includes cell walls having a porosity of about 55% to about 65% and extending along a longitudinal direction of the honeycomb structure to define cells between the cell walls. Each of the cells is sealed at either end of the cells. The zeolite is supported on the cell walls of the honeycomb structure. An amount of the zeolite supported on the cell walls is from about 80 g/L to about 150 g/L. A thermal conductivity of the cell walls supporting the zeolite is about 3 W/mK or more.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
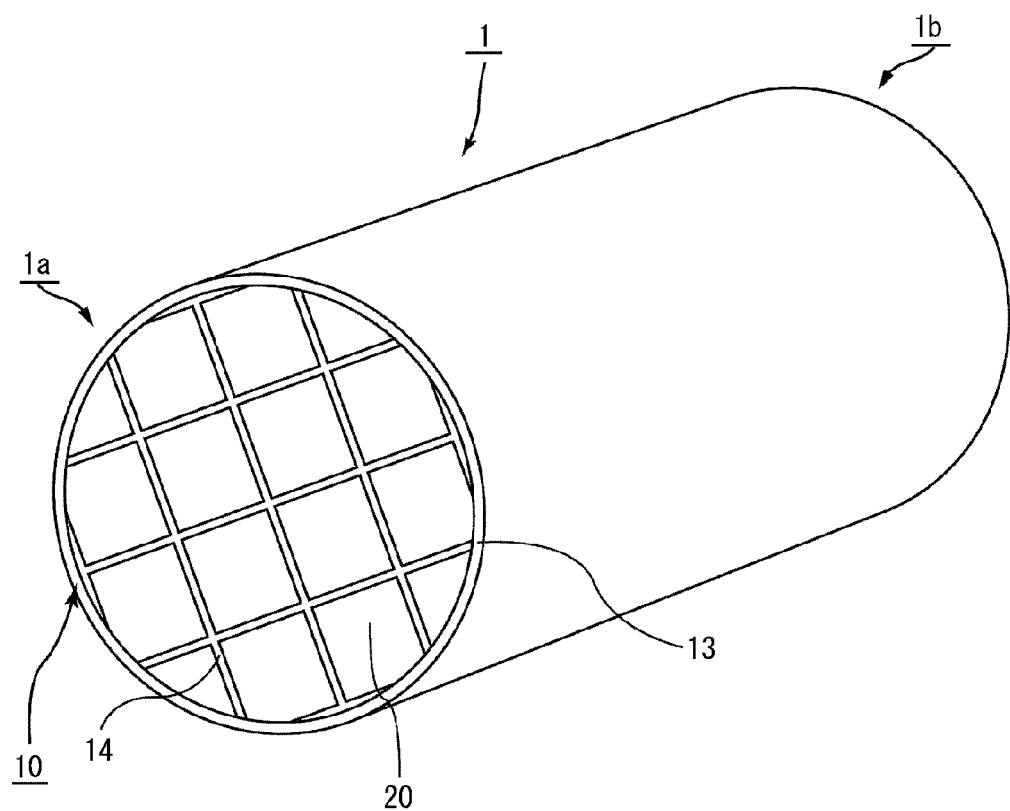
FIG. 1 is a perspective view that schematically shows one example of the honeycomb filter according to an embodiment of the present invention.

The present inventors tried to sequentially carry out conversion of NOx and removal of PM using the aforementioned urea SCR device and a DPF.

Specifically, the present inventors connected the urea SCR device and the DPF in series and investigated various combinations of the urea SCR device and the DPF. As a result, the present inventors have found that it is possible to efficiently carry out conversion of NOx and removal of PM when the DPF is disposed at an upstream of exhaust gases closer to an exhaust outlet of a diesel engine so as to first remove PM, and then exhaust gases containing NOx are converted by a urea SCR device disposed at a downstream of the DPF.

However, since the exhaust gas purifying apparatus in which the urea SCR device and the DPF are connected in series needs relatively a large space, the exhaust gas purifying apparatus does not meet the needs from the recent vehicle development that seeks to reduce the space for an exhaust gas purifying apparatus.

In order to meet the development needs, the present inventors have investigated and had an idea that integration of the function of the catalyst carrier of a urea SCR device and the function of a DPF would solve the space reduction problem. Accordingly, they have produced a honeycomb filter in which a zeolite is supported on a DPF.

Measurement of the NOx conversion rate using the thus manufactured honeycomb filter has revealed that a desired NOx conversion rate can be achieved at an early stage of the operation.

Contrary to expectation of the inventors, however, after regeneration process of the honeycomb filter, the NOx conversion rate has been proved to be significantly reduced. It has been known that the more the regeneration process is repeated, in particular, the more the NOx conversion rate is reduced.

In order to solve the aforementioned problems, the present inventors investigated the causes of the reduction of the NOx conversion rate after regeneration process in the honeycomb filter in which a zeolite is supported on the cell wall.

As a result, they have found that the honeycomb filter is heated to about 850° C. or more with the heat generated by burning of PM (hereinafter simply referred to as PM burning heat) in regeneration process.

They also have found that the zeolite sinters when the honeycomb filter is exposed to a high temperature of about 850° C. or more for a long time (hereinafter, the temperature causing sintering of zeolite is also referred to simply as sintering temperature).

This is supposed to be the cause for reduction of the NOx conversion rate after regeneration process.

Based on the supposition, the present inventors made a keen investigation in view of prevention of sintering of zeolite and reached the idea that, if heat dissipation capability of the honeycomb filter is increased, PM burning heat generated in regeneration process can be efficiently dissipated, and therefore it is possible to prevent the honeycomb filter from being exposed to the sintering temperature for a long period of time.

The present inventors continued the investigation further based on the foregoing ideas, and consequently found that a honeycomb filter tends to have a high heat dissipation capability when the honeycomb filter has a predetermined thermal conductivity or more. Moreover, the present inventors also have found that the NOx conversion rate of the honeycomb filter tends to be increased by controlling the porosity of the honeycomb structure and the amount of the zeolite supported on the cell wall. Accordingly, the present inventors finally completed according to the embodiments of the present invention capable of solving the problems mentioned earlier.

Namely, the honeycomb filter according to an embodiment of the present invention includes a honeycomb structure having a large number of cells each sealed at either end thereof and placed longitudinally in parallel with one another with a cell wall therebetween and a zeolite supported on the cell wall of the honeycomb structure, wherein the honeycomb structure contains silicon carbide, a porosity of the cell wall of the honeycomb structure is from about 55% to about 65%, an amount of the zeolite supported on the cell wall is from about 80 g/L to about 150 g/L, and a thermal conductivity of the cell wall supporting the zeolite is about 3 W/mK or more.

The honeycomb filter according to the embodiments of the present invention tends to exert a high PM capturing effect and also tends to have a high NOx conversion rate even after repeating the regeneration process.

The following will discuss details of those features referring to figures.

Figure 2A:
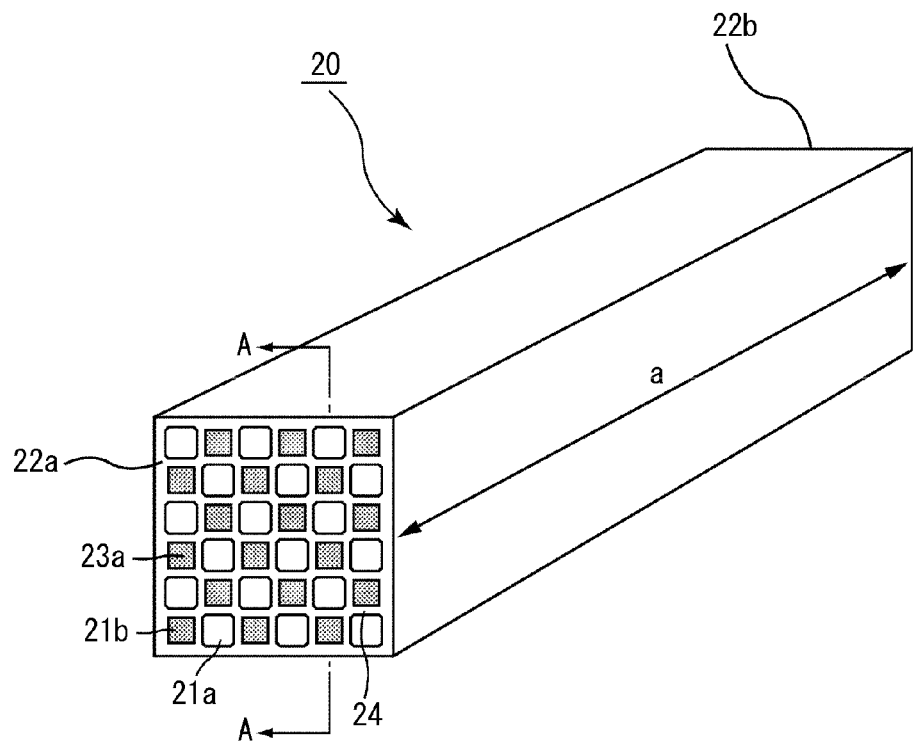
FIG. 2A is a perspective view that schematically shows one example of a honeycomb fired body forming a honeycomb structure of the honeycomb filter according to an embodiment of the present invention.
Figure 2B:
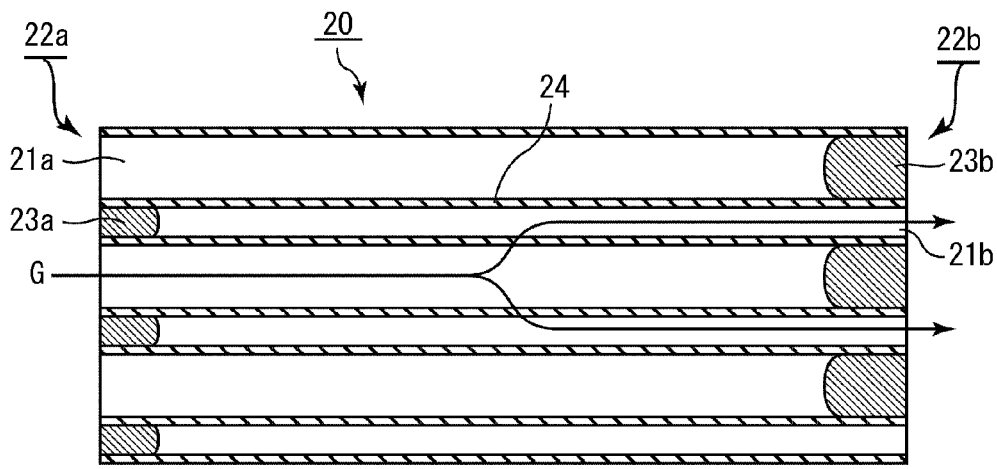
FIG. 2B is an A-A line cross-sectional view of the honeycomb fired body shown in FIG. 2A.

FIG. 1 is a perspective view that schematically shows one example of a honeycomb filter according to an embodiment of the present invention. FIG. 2A is a perspective view that schematically shows one example of a honeycomb fired body forming a honeycomb structure of the honeycomb filter according to an embodiment of the present invention, and FIG. 2B is an A-A line cross-sectional view of the honeycomb fired body shown in FIG. 2A.

A honeycomb filter 1 according to the embodiments of the present invention shown in FIG. 1 includes a honeycomb structure 10 and a zeolite (not shown) supported on cell walls of the honeycomb structure 10.

The honeycomb structure 10 will be first described.

The honeycomb structure 10 shown in FIG. 1 includes a ceramic block in which a plurality of honeycomb fired bodies 20 made of materials including silicon carbide are bonded with one another with an adhesive layer 14 interposed therebetween.

A coat layer 13 is formed on the periphery of the ceramic block. The coat layer is optionally formed depending on needs.

In this Description, a honeycomb structure which is formed of a plurality of honeycomb fired bodies bonded with one another with an adhesive layer interposed therebetween is also referred to as an aggregated honeycomb structure.

A honeycomb fired body 20 shown in FIG. 2A and FIG. 2B includes a large number of cells placed in parallel with each other in the longitudinal direction (shown by a double-sided arrow "a" in FIG. 2A) of the honeycomb fired body 20. The large number of cells include a large volume cell 21a and a small volume cell 21b having different shapes from one another.

The large volume cell 21a is open at an end portion on a first end face 22a side (1a side of the first end face of the honeycomb filter) of the honeycomb fired body 20 and is sealed with a sealing material 23b at an end portion on a second end face 22b side (1b side of the second end face of the honeycomb filter) of the honeycomb fired body 20.

On the other hand, the small volume cell 21b is open at an end portion on the second end face 22b side of the honeycomb fired body 20 and is sealed with a sealing material 23a at an end portion on the first end face 22a side of the honeycomb fired body 20.

Therefore, when the honeycomb filter 1 is used for a urea SCR device, exhaust gases G (in FIG. 2B, "G" indicates exhaust gases and the arrow indicates a flowing direction of exhaust gases) introduced to the large volume cell 21a surely pass through the cell wall 24 interposed between the large volume cell 21a and the small volume cell 21b and then flow out from the small volume cell 21b.

Accordingly, PM in exhaust gases is captured by the cell wall 24.

Details of structures of the large volume cell 21a and the small volume cell 21b will be described later in the first embodiment of the present invention.

The zeolite supported on the cell wall 24 of the honeycomb structure 10 (honeycomb fired body 20) functions as a catalyst for catalytic reduction which acts on NOx in combination with a reducing agent such as ammonia to reduce NOx into $N_2$.

Therefore, when the honeycomb filter 1 is used for a urea SCR device, NOx in exhaust gases is reduced to $N_2$ by the action of the zeolite supported on the cell wall 24 and the action of ammonia derived from urea water sprayed from a urea spray nozzle of the urea SCR device while the exhaust gases pass through the cell wall 24.

Since the thermal conductivity of the cell wall 24 supporting the zeolite is about 3 W/mK or more, the honeycomb filter 1 tends to have a sufficiently high heat dissipation capability.

Therefore, when exhaust gases are purified by a urea SCR device including the honeycomb filter 1, PM burning heat generated in regeneration process tends to be efficiently dissipated from the honeycomb filter 1.

Thus, the honeycomb filter 1 is less likely to be exposed to the sintering temperature for a long period of time and deactivation of the zeolite is less likely to be caused. Accordingly, even in the case of repeating regeneration process, the NOx conversion rate tends to be kept at a high level.

The porosity of the honeycomb structure 10 in which zeolite is not supported (honeycomb fired body 20 in which zeolite is not supported) is from about 55% to about 65%.

In the case where the porosity of the honeycomb structure (honeycomb fired body in which zeolite is not supported) is about 55% or more, when a large amount of zeolite is supported on the honeycomb structure, pores of the cell wall are less likely to be clogged with the zeolite, making it easier for exhaust gases to pass through the cell wall. As a result, NOx tends to be sufficiently converted, and further the pressure loss is less likely to be increased.

In the case where the porosity of the honeycomb structure is about 65% or less, the ratio of the pores forming the cell wall tends not to become too high.

Therefore, the thermal conductivity of the cell wall supporting zeolite tends not to be low and the heat dissipation capability of the honeycomb filter tends not to be decreased. Moreover, the strength of the honeycomb structure (honeycomb filter) tends not to be reduced.

The amount of the zeolite supported on the cell wall 24 of the honeycomb structure 10 (honeycomb fired body 20) is from about 80 g/L to about 150 g/L, and thus the zeolite is supported on the cell wall in an amount sufficient for reducing NOx.

When the amount of the zeolite supported on the cell wall of the honeycomb structure is about 80 g/L or more, the amount of the zeolite supported on the cell wall is less likely to be too small and thus NOx tends to be sufficiently converted.

When the amount of the zeolite supported on the cell wall of the honeycomb structure is about 150 g/L or less, pores of the cell wall tend not to be clogged with zeolite. Thus, pores which allow passage of exhaust gasses therethrough tend not to be decreased, making it easier for exhaust gasses to pass through the cell wall. Consequently, NOx tends to be sufficiently converted. Moreover, pressure loss is less likely to be increased.

For the reasons mentioned earlier, the honeycomb filter 1 according to the embodiments of the present invention tends to have PM capturing effect and also have a high NOx conversion rate even after repeating regeneration process.

A honeycomb filter according to the embodiments of the present invention has the thermal conductivity of from about 5 W/mK to about 10 W/mK.

Therefore, the heat dissipation capability of the honeycomb filter tends to be higher so that PM burning heat generated in regeneration process tends to be more efficiently dissipated from the honeycomb filter.

Therefore, the honeycomb filter tends to be prevented from being exposed to the sintering temperature in regeneration process.

In a honeycomb filter according to the embodiments of the present invention, the large number of cells include a large volume cell and a small volume cell, and an area ratio of a cross sectional area of the large volume cell perpendicular to the longitudinal direction relative to a cross sectional area of the small volume cell perpendicular to the longitudinal direction is from about 1.4 to about 2.4.

In the case where the honeycomb filter is used for a urea SCR device, the honeycomb filter may be placed in a casing in a manner that inlet-side cells for introducing exhaust gases include the large volume cells and outlet-side cells for discharging exhaust gases include the small volume cells. The surface area of the inlet-side cells may thus be larger.

Accordingly, in purification of exhaust gases, the thickness of the accumulated PM layer may be made thinner than that of a honeycomb structure (honeycomb filter) in which a total of the surface area of the gas-inlet side cells is the same as a total of the surface area of the gas-outlet side cells. Consequently, it may become easier to inhibit an increase in the pressure loss or to increase the maximum PM capturing amount.

Further, in a case of capturing a given amount of PM, the honeycomb filter according to the embodiments of the present invention has a thinner PM accumulating layer and thus the PM may be easily burned.

Thus, it may become easier to reduce the frequency of regeneration and to shorten the time for the honeycomb filter to be exposed to a sintering temperature.

In a honeycomb filter according to the embodiments of the present invention, a cross section of the large volume cell perpendicular to the longitudinal direction has a substantially octagonal shape, and a cross section of the small volume cell perpendicular to the longitudinal direction has a substantially quadrangular shape.

In a honeycomb filter according to the embodiments of the present invention, a cross section of the large volume cell perpendicular to the longitudinal direction has a substantially quadrangular shape, and a cross section of the small volume cell perpendicular to the longitudinal direction has a substantially quadrangular shape.

The honeycomb filters having the cells with the aforementioned shapes tend to preferably enjoy the effects of the honeycomb filter according to the embodiments of the present invention.

In a honeycomb filter according to the embodiments of the present invention, the zeolite includes at least one of a β-type zeolite, a ZSM-5 type zeolite, and a SAPO.

In a honeycomb filter according to the embodiments of the present invention, the zeolite includes at least one of ion-exchanged with a copper ion and an iron ion.

In a honeycomb filter according to the embodiments of the present invention, the honeycomb structure includes a plurality of honeycomb fired bodies combined with one another with an adhesive layer interposed therebetween.

First Embodiment

The following will discuss a honeycomb filter according to a first embodiment of the present invention referring to the figures.

Explanation of the structures and the like which are overlapped with those in the honeycomb filter according to the embodiments of the present invention described above will be omitted.

The honeycomb filter of the present embodiment includes a honeycomb structure and a zeolite supported on the cell wall of the honeycomb structure. The honeycomb structure of the present embodiment is an aggregated honeycomb structure.

A coat layer 13 is formed on the periphery of a honeycomb structure 10 (ceramic block formed of a plurality of honeycomb fired bodies 20 bonded with one another with an adhesive layer interposed therebetween) for preventing leak of exhaust gases or preventing damage of the honeycomb structure 10.

The coat layer 13 contains inorganic fibers such as alumina, inorganic particles such as silicon carbide, an inorganic binder such as silica sol, an organic binder such as carboxymethyl cellulose, and the like.

Next, the structures of the large volume cell 21a and the small volume cell 21b will be described in detail referring to FIG. 2A and FIG. 2B.

The large number of cells in the honeycomb fired body 20 shown in FIG. 2A include the large volume cell 21a having a relatively larger cross-sectional area perpendicular to the longitudinal direction thereof (direction of the double-sided arrow "a" in FIG. 2A) than the small volume cell 21b, and the small volume cell 21b having a relatively smaller cross-sectional area perpendicular to the longitudinal direction thereof than the large volume cell 21a.

The large volume cell 21a has a substantially octagonal shape in the cross section perpendicular to the longitudinal direction of the honeycomb fired body 20. The small volume cell 21b has a substantially quadrangular shape in the cross section perpendicular to the longitudinal direction of the honeycomb fired body 20.

The area ratio of the cross-sectional area of the large volume cell 21a perpendicular to the longitudinal direction relative to the cross-sectional area of the small volume cell 21b perpendicular to the longitudinal direction is from about 1.4 to about 2.4.

The first end face 22a of the honeycomb fired body 20 forms the first end face 1a of the honeycomb filter 1, and the second end face 22b of the honeycomb fired body 20 forms the second end face 1b of the honeycomb filter 1.

The porosity of a honeycomb structure in which zeolite is not supported on the cell wall is from about 55% to about 65%.

In this Description, the porosity of the cell wall of the honeycomb structure refers to a porosity of the cell wall of the honeycomb structure which does not support a zeolite.

The porosity can be measured through a conventionally known method such as a mercury porosimetry method, Archimedes method, a weighing method, and a measuring method using a scanning electronic microscope (SEM).

The amount of the zeolite supported on the cell wall of the honeycomb structure is from about 80 g/L to 150 g/L.

In this Description, the amount of the zeolite supported on the cell wall of the honeycomb structure refers to the weight of zeolite per one liter apparent volume of the honeycomb structure.

In the case where the honeycomb structure is an aggregate honeycomb structure, the apparent volume of the honeycomb structure includes the volume of adhesive layers and further includes the volume of a coat layer when a coat layer is formed.

The thermal conductivity of the cell wall supporting a zeolite is about 3 W/mK or more.

The thermal conductivity of the cell wall supporting a zeolite is preferably 3.2 W/mK or more, is more preferably from about 5 W/mK to about 10 W/mK, and is still more preferably about 5.1 W/mK to about 10.0 W/mK. Reasons for this are described earlier, and thus explanation is omitted.

The thermal conductivity in this Description refers to a thermal conductivity obtained by a laser flash method.

The species of the zeolite is not particularly limited as long as it can reduce NOx, and examples of the zeolite include β-type zeolite, Y-type zeolite, ferrierite, ZSM-5 type zeolite, mordenite, faujasite, A-type zeolite, L-type zeolite, SAPO (Silicoaluminophosphate), MeAPO (Metalaluminophosphate), and the like. Each of these may be used alone or two or more kinds of these may be used in combination.

At least one species selected from the group consisting of β-type zeolite, ZSM-5 type zeolite, and SAPO is preferable among the above zeolites. Preferable among SAPO is SAPO-5, SAPO-11, or SAPO-34, and SAPO-34 is more preferable. Preferable among MeAPO is MeAPO-34.

In this Description, a zeolite includes not only aluminosilicate but analogues of zeolite such as aluminophosphate as well.

The zeolite may be ion-exchanged with metal ions.

Examples of the metal ions include a copper ion, an iron ion, a nickel ion, a zinc ion, a manganese ion, a cobalt ion, a silver ion, a vanadium ion, and the like. Each of these may be used alone or two or more kinds of these may be used in combination.

Preferably, zeolite is ion-exchanged with a copper ion and/or iron ion.

The following will discuss one example of a method for manufacturing a honeycomb filter according to the present embodiment.

Here, explanation will be made on a method for manufacturing a honeycomb filter in which zeolite is supported on the cell wall of a honeycomb structure that is formed of the honeycomb fired body shown in FIG. 2A and FIG. 2B.

(Wet Mixture Preparation Process)

First, a wet mixture for manufacturing a molded body is prepared by mixing silicon carbide powders having different average particle diameters as a ceramic material, an organic binder, a pore forming agent, a liquid plasticizer, a liquid lubricant, and water.

In preparation of the wet mixture, the average particle diameter of the coarse powder of the silicon carbide and the fine powder of the silicon carbide, particle diameter of the pore forming agent, and blending ratio of each material are properly controlled so that a honeycomb structure to be prepared has a porosity of from about 55% to 65%.

(Molding Process)

Next, the wet mixture is introduced into an extrusion molding apparatus and then extrusion-molded so as to manufacture a honeycomb molded body having a predetermined shape.

A honeycomb molded body is manufactured by using a die which can form a honeycomb molded body in which a large volume cell having a substantially octagonal shape and a larger area in the cross section perpendicular to the longitudinal direction and a small volume cell having a substantially quadrangular shape and a smaller area in the cross section perpendicular to the longitudinal direction are alternately disposed, and the area ratio of the cross-sectional area of the large volume cell perpendicular to the longitudinal direction relative to the cross-sectional area of the small volume cell perpendicular to the longitudinal direction in the honeycomb molded body is adjusted to be in a predetermined range.

(Drying Process)

Next, cutting of both ends of the honeycomb molded body with a cutting apparatus is performed to cut the honeycomb molded body into a predetermined length. The cut honeycomb molded body is dried with a drying apparatus to manufacture a honeycomb dried body.

(Sealing Process)

One end of each of the large volume cells and one end of each of the small volume cells of the manufactured honeycomb dried body are filled in with a predetermined amount of a sealing material paste which is to be a sealing material and has the same composition as that of the wet mixture, thereby sealing the cells.

Specifically, sealing is performed so that the large volume cell is sealed at an end portion on the second end face side of the honeycomb fired body, and the small volume cell is sealed at an end portion on the first end face side of the honeycomb fired body in a honeycomb fired body manufactured through the below-mentioned process.

Accordingly, a cell-sealed honeycomb molded body is manufactured.

(Degreasing Process)

The cell-sealed honeycomb molded body is heated in a degreasing furnace to remove organic matters such as an organic binder contained in the cell-sealed honeycomb molded body to manufacture a honeycomb degreased body.

(Firing Process)

The manufactured honeycomb degreased body is transported to a firing furnace and is then fired under argon atmosphere at from about 2000° C. to about 2300° C. for from about 1 hour to about 10 hours.

As a result, a honeycomb fired body having a shape shown in FIG. 2A and FIG. 2B is manufactured. Namely, a substantially quadrangular pillar-shaped honeycomb fired body having large volume cells and small volume cells, with either one end of each of the cells sealed is manufactured.

By repeating the process after the molding, a plurality of honeycomb fired bodies each having substantially the same shape as that mentioned earlier are manufactured.

A zeolite may be supported on the cell wall of the honeycomb fired bodies by performing the below-mentioned zeolite supporting process on the honeycomb fired bodies.

(Manufacturing Process of Honeycomb Structure)

Next, binding is performed by applying an adhesive paste between the honeycomb fired bodies (or honeycomb fired body in which a zeolite is supported on the cell wall thereof, hereinafter the same) to form an adhesive paste layer and then by drying and solidifying the adhesive paste layer to form an adhesive layer. Accordingly, a substantially quadrangular pillar-shaped ceramic block in which a plurality of the honeycomb fired bodies are bonded with one another with an adhesive layer interposed therebetween is manufactured.

In this process, the plurality of the honeycomb fired bodies are arranged so that the first end faces of the respective honeycomb fired bodies are disposed on the same side, and then the honeycomb fired bodies are bonded with one another.

The adhesive paste to be preferably used is an adhesive paste including inorganic fibers and/or whiskers, an inorganic binder, and an organic binder.

Periphery cutting is carried out by cutting the periphery of the substantially quadrangular pillar-shaped ceramic block with a diamond cutter so as to provide a substantially round pillar-shaped ceramic block.

In the case where below-mentioned the coating layer forming is not performed, the substantially round pillar-shaped ceramic block is used as a honeycomb structure according to the embodiment of the present invention.

Coating layer forming is performed by applying a coating material paste on the periphery of the substantially round pillar-shaped ceramic block and drying and solidifying the coating material paste with a hot air drying apparatus or the like to form a coat layer.

As the coating material paste, a paste that is the same as the adhesive paste may be used.

Through the foregoing process, a honeycomb structure can be manufactured.

(Zeolite Supporting Process)

A predetermined amount of a zeolite is suspended in water to prepare a zeolite slurry.

The honeycomb structure is dipped in the above-obtained zeolite slurry and is taken out from the slurry. Then, the resulting honeycomb structure is heated and fired so that the zeolite is supported on the cell wall of the honeycomb structure.

The amount of the zeolite to be supported on the cell wall of the honeycomb structure is controlled to be from about 80 g/L to about 150 g/L. The amount of the zeolite can be controlled by, for example, changing the concentration of the slurry, changing the number of times of repeating the dipping into slurry and the heating, and the like.

Through the above process, a honeycomb filter in which a zeolite is supported on the cell wall of the honeycomb structure is manufactured.

The following will discuss effects of the honeycomb filter of the present embodiment.

(1) Since a zeolite is supported on the cell wall of the honeycomb structure forming the honeycomb filter of the present embodiment, and the cell wall supporting the zeolite has a thermal conductivity of about 3 W/mK or more, the honeycomb filter tends to have a sufficiently high heat dissipation capability.

Therefore, in purification of exhaust gases using a urea SCR device including the honeycomb filter of the present embodiment, PM burning heat generated during regeneration process tends to be efficiently dissipated from the honeycomb filter.

For this reason, the honeycomb filter is less likely to be exposed to the sintering temperature for a long period of time and deactivation of the zeolite is less likely to be caused. Therefore, the honeycomb filter tends to exhibit a high NOx conversion rate even when repeating regeneration process.

In the case where the thermal conductivity is from about 5 W/mK to about 10 W/mK, in particular, the PM burning heat tends to be more efficiently dissipated from the honeycomb filter. The honeycomb filter may thus be prevented from being exposed to the sintering temperature for a long period of time.

(2) Since the porosity of the honeycomb structure is from about 55% to about 65% (before supporting zeolite), even when a large amount of zeolite is supported on the honeycomb structure, pores of the cell wall are less likely to be clogged with the zeolite. Therefore, exhaust gases easily pass through cell. As a result, NOx tends to be sufficiently converted and the pressure loss tends to be decreased.

Moreover, since the ratio of pores formed in the cell wall of the honeycomb structure is set in an appropriate range, the thermal conductivity of the cell wall supporting the zeolite tends to be high and a high heat dissipation capability of the honeycomb filter may be easily achieved. Further, the strength of the honeycomb structure (honeycomb filter) tends to be increased and honeycomb structure may be less breakable.

(3) The amount of the zeolite supported on the cell wall of the honeycomb structure is from about 80 g/L to about 150 g/L, meaning that a sufficient amount of zeolite for reducing NOx is supported on the cell wall.

Pores of the cell wall are less likely to be clogged with zeolite. Therefore, exhaust gases tend to easily pass through the cell wall, thus making it easier to sufficiently convert NOx. Moreover, pressure loss tends to be decreased.

(4) The large number of cells of the honeycomb filter (honeycomb structure) include a large volume cell and a small volume cell. An area ratio of a cross sectional area of the large volume cell perpendicular to the longitudinal direction relative to a cross sectional area of the small volume cell perpendicular to the longitudinal direction is from about 1.4 to about 2.4.

In the case where the honeycomb filter of the present embodiment is used for a urea SCR device, a total surface area of the inlet-side cells may be made larger by using the large volume cells as the inlet-side cells and using the small volume cells as the outlet-side cells.

Accordingly, in purification of exhaust gases, the pressure loss tends to be prevented from increasing, or the maximum PM capturing amount tends to be increased. Furthermore, since the thickness of the accumulated PM layer tends to be decreased, burning of PM tends to be accelerated.

Consequently, number of regeneration process tends to be reduced, and a time for exposing the honeycomb filter to the sintering temperature tends to be shortened.

The following will discuss Examples that specifically disclose the first embodiment of the present invention. The present invention is not limited to the Examples.

Example 1

(Wet Mixture Preparation Process)

An amount of 46.6% by weight of coarse powder of silicon carbide having an average particle diameter of 24 μm and 20.0% by weight of fine powder of silicon carbide having an average particle diameter of 0.5 μm as ceramic materials, 3.8% by weight of an organic binder (methylcellulose), 6.8% by weight of a pore-forming agent (hollow acrylic particles having an average particle diameter of 21 μm), 3.5% by weight of a lubricant (UNILUB, made by NOF Corporation), 1.6% by weight of a plasticizer (glycerin), and 17.4% by weight of water were mixed and kneaded to prepare a wet mixture.

(Molding Process)

The wet mixture was introduced to an extrusion-molding apparatus and extrusion-molded so that a quadrangular pillar-shaped honeycomb molded body as shown in FIG. 2A and FIG. 2B, which includes large volume cells each having a substantially octagonal shape in a cross sectional view and small volume cells each having a substantially quadrangular shape in a cross sectional view, with the cells not sealed, was manufactured.

(Drying Process)

By performing cutting to cut both ends of the honeycomb molded body with a cutting apparatus, the honeycomb molded body was cut into a predetermined length. The cut honeycomb molded body was dried by a micro wave drying apparatus so that a honeycomb dried body was manufactured.

(Sealing Process)

One end of each of the large volume cells and one end of each of the small volume cells of the manufactured honeycomb dried body were filled in with a predetermined amount of a sealing material paste which was to be a sealing material and had the same composition as that of the wet mixture to seal the cells so that a cell-sealed honeycomb molded body was manufactured.

Specifically, sealing is performed so that the large volume cell is sealed at an end portion on the second end face side of the honeycomb fired body, and the small volume cell is sealed at an end portion on the first end face side of the honeycomb fired body in a honeycomb fired body manufactured through the below-mentioned process.

(Degreasing Process)

The cell-sealed honeycomb molded body was heated at 400° C. in a degreasing furnace to remove organic matters such as an organic binder contained in the cell-sealed honeycomb molded body to manufacture a honeycomb degreased body.

(Firing Process)

The above-manufactured honeycomb degreased body was transported to a firing furnace and was then fired under argon atmosphere at 2250° C. for 5 hours.

As a result, a substantially quadrangular pillar-shaped honeycomb fired body as shown in FIG. 2A and FIG. 2B which includes large volume cells each having a substantially octagonal cross-sectional shape perpendicular to the longitudinal direction and small volume cells each having a substantially quadrangular cross-sectional shape perpendicular to the longitudinal direction, with either one end of each of the cells sealed, was manufactured.

The thus obtained honeycomb fired body had a size of 34.3 mm×34.3 mm×150 mm.

An area ratio of a cross sectional area of the large volume cell perpendicular to the longitudinal direction relative to a cross sectional area of the small volume cell perpendicular to the longitudinal direction was 1.55.

The porosity of the honeycomb fired body was 60%. The porosity was measured by a weighing method.

The above-manufactured honeycomb fired body is categorized as Type 1.

(Manufacturing Process of Honeycomb Structure)

An adhesive paste was applied between the honeycomb fired bodies to form adhesive paste layers, and the adhesive paste layers were dried and solidified to form adhesive layers. Accordingly, a ceramic block having a substantially quadrangular pillar shape in which sixteen pieces of the honeycomb fired bodies were bonded with one another with the adhesive layer interposed therebetween was manufactured.

In this process, the plurality of the honeycomb fired bodies were bonded with one another in a manner that the first end faces of the respective honeycomb fired bodies were arranged on the same side.

As the adhesive paste, an adhesive paste containing 30% by weight of alumina fiber having an average fiber length of 20 μm, 21% by weight of silicon carbide powder having an average particle diameter of 0.6 μm, 15% by weight of silica sol (solid content 30% by weight), 5.6% by weight of carboxymethyl cellulose, and 28.4% by weight of water was used.

Thereafter, periphery cutting was performed on the quadrangular pillar-shaped ceramic block so that a round pillar-shaped ceramic block having a diameter of 142 mm was manufactured.

Next, a coating material paste was applied on the periphery of the round pillar-shaped ceramic block, and the coating material paste was dried and solidified at a temperature of 120° C. so that a coat layer was formed on the periphery of the ceramic block.

As the coating material paste, the same paste as the aforementioned adhesive paste was used.

Through the above process, a round pillar-shaped honeycomb structure having a size of 143.8 mm in diameter×150 mm in length was manufactured.

(Zeolite Supporting Process)

A sufficient amount of water was mixed with β-type zeolite powder (average particle diameter: 2 μm) ion-exchanged with an iron ion and then stirred to prepare a zeolite slurry.

The honeycomb structure was dipped in the zeolite slurry with one end side facing down for one minute. Thereafter, the resulting honeycomb structure was dried at 110° C. for one hour, and further fired at 700° C. for one hour so that the zeolite was supported on the cell wall of the honeycomb structure.

The process of dipping the honeycomb structure in the zeolite slurry, drying and firing was repeated so that the amount of the supported zeolite reached 80 g per one liter of the apparent volume of the honeycomb structure.

Through the above process, a honeycomb filter in which the zeolite was supported on the cell wall of the honeycomb structure was manufactured.

(Measurement of Thermal Conductivity)

The thermal conductivity of the cell wall supporting the zeolite in the honeycomb filter was measured by a laser flash method (according to JIS R 1611(2007) and JIS R 1650-3 (2002)).

The result showed that the thermal conductivity of the cell wall supporting the zeolite in the honeycomb filter manufactured in Example 1 was 7.5 W/mK.

The contents of JIS R 1611 (2007) and JIS R 1650-3 (2002) are incorporated herein by reference in their entirety.

(Measurement of NOx Conversion Rate)

First, a sample for measuring NOx conversion rate was manufactured according to the following process.

A holding sealing material was wound around the periphery of the honeycomb filter manufactured in the above zeolite supporting process. The resulting honeycomb filter was press-fitted into a cylindrical casing so that an exhaust gas purifying apparatus was manufactured.

The end portion on the exhaust gas inlet side of the exhaust gas purifying apparatus was connected to an introduction pipe coupled to a 2 L common-rail-type diesel engine. Further, the end portion on the exhaust gas outlet side of the exhaust gas purifying apparatus was connected to an exhaust pipe coupled to the outside.

Next, the engine was driven at the number of revolutions of 2000 $min^{-1}$ and a torque of 47 Nm so that exhaust gases from the engine were allowed to pass through the honeycomb filter.

After the engine had been driven until the amount of PM captured per one liter of the honeycomb filter reached 5.0 g, PM was burned in a post-injection method to carry out regeneration of the honeycomb filter.

The aforementioned regeneration process was repeated twenty times.

The regenerated honeycomb filter was cut by a diamond cutter to produce a single honeycomb fired body (34.3 mm×34.3 mm×150 mm). The cut-out honeycomb fired body was further cut shortened to manufacture a short-length body in a size of 34.3 mm×34.3 mm×40 mm.

In the same manner as the aforementioned sealing and degreasing, cells of the short-length body were sealed with the adhesive paste in a manner that one end of each of the cells was sealed, and the cell-sealed short-length body was degreased at 400° C. so that a sample for measuring NOx conversion rate was manufactured.

The NOx conversion rate was measured with a NOx conversion rate-measuring apparatus (Catalyst test system SIGU-2000, product of HORIBA, Ltd.).

The NOx conversion rate-measuring apparatus includes a gas generator and a reactor. A simulated exhaust gas generated by the gas generator was passed through the reactor in which the sample for measuring NOx conversion rate was placed.

Composition of the simulated exhaust gas includes NO:175 ppm, $NO_2$:175 ppm, $NH_3$:350 ppm, $O_2$:14%, $CO_2$: 5%, $H_2O$:10%, and $N_2$:balance. This composition was obtained by controlling each the amount of the gas flow rate with a flow rate controller.

The temperature of the reactor was fixed at 200° C. As a condition to allow zeolite to contact the simulated exhaust gas, the space velocity (SV) was set at 70000 $hr^{-1}$.

The NOx concentration "$N_0$" before the simulated exhaust gas passed through the sample for measuring NOx conversion rate and the NOx concentration "$N_1$" after the simulated exhaust gas passed through the sample for measuring NOx conversion rate were measured, and then the NOx conversion rate was calculated in accordance with the following equation.

$$NOx\ conversion\ rate(\%) = [(N0-N1)/N0] \times 100$$

The result showed that the regenerated sample for measuring NOx conversion rate manufactured in Example 1 had a NOx conversion rate of 57%.

Honeycomb filters and samples for measuring NOx conversion rate of Examples 2 to 6 and Comparative Examples 1 to 5 were manufactured according to the below-mentioned process.

Example 2

A honeycomb filter and a sample for measuring NOx conversion rate were manufactured in the same manner as those in Example 1, except that the amount of the zeolite supported on the cell wall of the honeycomb structure was set to 120 g/L.

The honeycomb fired body manufactured in Example 2 was the same as the honeycomb fired body manufactured in Example 1 and was thus Type 1.

Examples 3 to 6, and Comparative Examples 1 to 5

Honeycomb filters and samples for measuring NOx conversion rate were manufactured in the same manner as those in Example 1, except that the porosities of the honeycomb fired bodies were changed by altering the particle diameter of each powder to be blended, the blending ratios, and other factors as shown in Tables 1-1 and 1-2 and that the zeolite supporting amount was changed as shown in Table 2.

The amount of the zeolite to be supported was controlled by appropriately repeating dipping of the honeycomb structure into the zeolite slurry, the drying, and the firing so that a predetermined amount of zeolite was supported per one liter apparent volume of the honeycomb structure.

The conditions for manufacturing the honeycomb fired bodies manufactured in Examples 3, 4, and Comparative Example 5 are the same, and those honeycomb fired bodies are categorized as Type 2.

The honeycomb fired body manufactured in Example 5 is categorized as Type 5, and the honeycomb fired body manufactured in Comparative Example 3 was categorized as Type 6.

The honeycomb fired body manufactured in Example 6 was categorized as Type 3. The conditions for manufacturing the honeycomb fired bodies in Comparative Examples 1 and 2 are the same, and those honeycomb fired bodies are categorized as Type 4.

The honeycomb fired body manufactured in Comparative Example 4 is Type 1.

Tables 1-1 and 1-2 collectively show blending ratios of the materials of the wet mixture, firing conditions, types and porosity of the honeycomb fired bodies manufactured in each Example and each Comparative Example.

TABLE 1-1

| Type of Honeycomb fired body | Silicon carbide (coarse powder) | | Silicon carbide (fine powder) | | Methylcellulose Blending ratio (% by weight) | Hollow acrylic particle | |
|---|---|---|---|---|---|---|---|
| | Particle diameter (μm) | Blending ratio (% by weight) | Particle diameter (μm) | Blending ratio (% by weight) | | Particle diameter (μm) | Blending ratio (% by weight) |
| Type1 | 24 | 46.6 | 0.5 | 20.0 | 3.8 | 21 | 6.8 |
| Type2 | 28 | 45.7 | 0.5 | 19.7 | 3.7 | 25 | 8.5 |
| Type3 | 20 | 45.7 | 0.5 | 19.7 | 3.7 | 18 | 8.5 |
| Type4 | 20 | 44.9 | 0.5 | 19.2 | 3.7 | 21 | 10.2 |
| Type5 | 20 | 47.5 | 0.5 | 20.3 | 3.9 | 21 | 5.1 |
| Type6 | 20 | 48.3 | 0.5 | 20.8 | 3.9 | 21 | 3.4 |

TABLE 1-2

| Type of Honeycomb fired body | UNILUB Blending ratio (% by weight) | Glycerin Blending ratio (% by weight) | Water Blending ratio (% by weight) | Firing condition | | Porosity (%) |
|---|---|---|---|---|---|---|
| | | | | Temperature (° C.) | Time (hr) | |
| Type1 | 3.5 | 1.6 | 17.4 | 2250 | 5 | 60 |
| Type2 | 3.4 | 1.6 | 17.4 | 2250 | 5 | 65 |
| Type3 | 3.4 | 1.6 | 17.4 | 2100 | 3 | 65 |
| Type4 | 3.4 | 1.5 | 17.1 | 2150 | 3 | 70 |
| Type5 | 3.6 | 1.6 | 18.0 | 2200 | 3 | 55 |
| Type6 | 3.6 | 1.7 | 18.3 | 2150 | 3 | 50 |

The thermal conductivity and the NOx conversion rate after the regeneration process were measured for the honeycomb filters and the samples for measuring NOx conversion rate manufactured in Examples 2 to 6 and Comparative Example 1 to 5 in the same manner as in Example 1. Further, the porosity of the honeycomb fired bodies (Type 1 to Type 6) was measured in the same manner as in Example 1.

Table 2 showed the results.

TABLE 2

| | Honeycomb fired body | Thermal conductivity (W/mK) | Porosity (%) | Zeolite supporting amount (g/L) | NOx conversion rate after regeneration process (%) |
|---|---|---|---|---|---|
| Example1 | Type1 | 7.5 | 60 | 80 | 57 |
| Example2 | Type1 | 6.2 | 60 | 120 | 65 |
| Example3 | Type2 | 5.5 | 65 | 120 | 62 |
| Example4 | Type2 | 5.1 | 65 | 150 | 62 |
| Example5 | Type5 | 10.0 | 55 | 120 | 60 |
| Example6 | Type3 | 3.2 | 65 | 150 | 52 |
| Comparative Example1 | Type4 | 2.8 | 70 | 120 | 48 |
| Comparative Example2 | Type4 | 2.6 | 70 | 150 | 42 |
| Comparative Example3 | Type6 | 13.5 | 50 | 120 | 45 |
| Comparative Example4 | Type1 | 7.5 | 60 | 70 | 40 |
| Comparative Example5 | Type2 | 4.8 | 65 | 170 | 43 |

Table 2 shows that the NOx conversion rate after regeneration process is high when the honeycomb filter according to the embodiments of the present invention satisfies the structure (1): the porosity of the honeycomb structure is from about 55% to about 65%; the structure (2): the amount of the zeolite supported on the cell wall of the honeycomb structure is from about 80 g/L to about 150 g/L; and the structure (3): the thermal conductivity of the cell wall supporting the zeolite is likely to be about 3 W/mK or more.

On the other hand, when at least one of the foregoing structures (1) to (3) of the honeycomb filter according to the embodiments the present invention is not satisfied, the NOx conversion rate after regeneration process is likely to be low.

Second Embodiment

The following will discuss a second embodiment of the present invention.

In the present embodiment, the honeycomb structure forming the honeycomb filter includes a single honeycomb fired body. The honeycomb structure including a single honeycomb fired body is also referred to as an integral honeycomb structure.

Figure 3A:
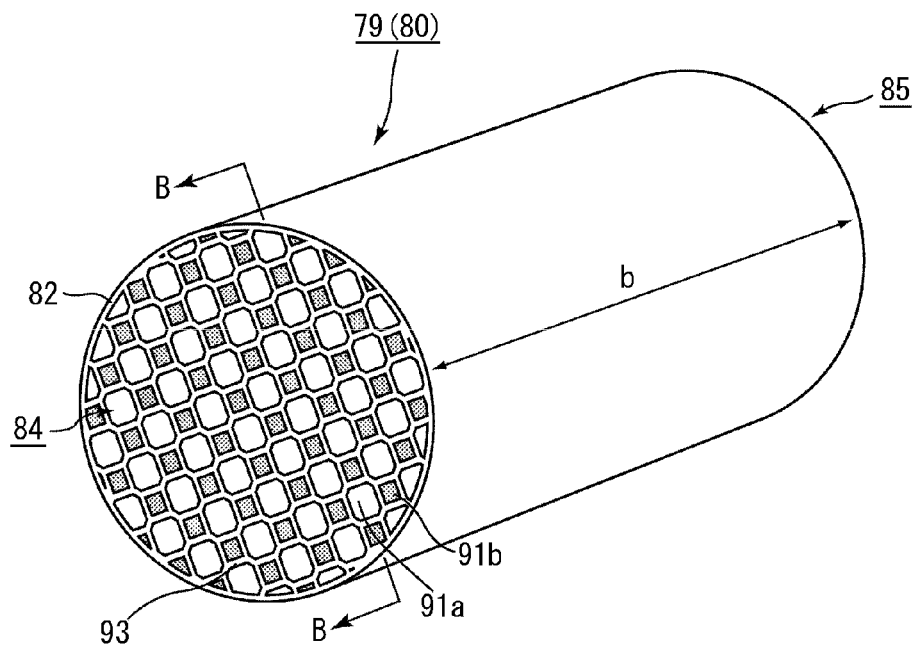
FIG. 3A is a perspective view that schematically shows one example of a honeycomb filter according to a second embodiment of the present invention.
Figure 3B:
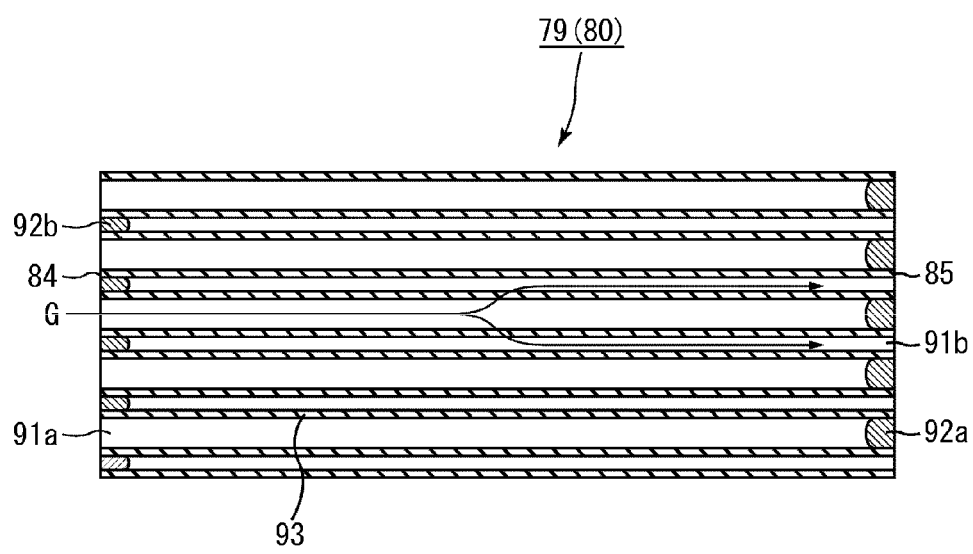
FIG. 3B is a B-B line cross-sectional view of the honeycomb filter shown in FIG. 3A.

FIG. 3A is a perspective view that schematically shows one example of the honeycomb filter, and FIG. 3B is a B-B line cross-sectional view of the honeycomb filter shown in FIG. 3A.

The honeycomb filter 79 shown in FIG. 3A includes a honeycomb structure 80 made of materials including silicon carbide, and a zeolite (not shown) supported on the cell wall of the honeycomb structure 80.

A honeycomb filter 79 (honeycomb structure 80) has a substantially round pillar shape including a first end face 84 and a second end face 85, and has a large volume cell 91a having a relatively larger cross-sectional area perpendicular to the longitudinal direction thereof (direction of the double-sided arrow "b" in FIG. 3A) than a small volume cell 91b, and the small volume cell 91b having a relatively smaller cross-sectional area perpendicular to the longitudinal direction than the large volume cell 91a.

The large volume cell 91a has a substantially octagonal shape in the cross section perpendicular to the longitudinal direction thereof. The small volume cell 91b has a substantially quadrangular shape in the cross section perpendicular to the longitudinal direction thereof.

A coat layer 82 was formed on the periphery of the honeycomb structure 80.

The large volume cell 91a is open at an end portion on the first end face 84 side of the honeycomb structure 80 and is sealed with a sealing material 92a at an end portion on the second end face 85 side of the honeycomb structure 80. On the other hand, the small volume cell 91b is open at an end portion on the second end face 85 side of the honeycomb structure 80 and is sealed with a sealing material 92b at an end portion on the first end face 84 side of the honeycomb structure 80. A cell wall 93 interposed between the large volume cell 91a and the small volume cell 91b functions as a filter.

Namely, exhaust gases introduced to the large volume cell 91a surely pass through the cell wall 93 and then flow out from the small volume cell 91b.

The thermal conductivity of the cell wall 93 supporting the zeolite is about 3 W/mK or more, and thus the heat dissipation capability of the honeycomb filter 79 tends to be sufficiently high. For this reason, the honeycomb filter 79 is less likely to be exposed to the sintering temperature for a long period of time in regeneration process, and thus a high NOx conversion rate tends to be maintained.

Moreover, since the porosity of the honeycomb structure 80 in a condition where a zeolite is not supported on the cell wall 93 is from about 55% to about 65%, NOx tends to be sufficiently converted, and the pressure loss tends to be decreased. Also, the strength of the honeycomb filter 79 tends to be high.

Moreover, since the amount of the zeolite supported on the cell wall of the honeycomb structure 80 is from about 80 g/L to about 150 g/L, NOx tends to be sufficiently converted and also the pressure loss tends to be decreased.

Kinds of the zeolite are the same as those of the first embodiment of the present invention.

An area ratio of a cross sectional area of the large volume cell perpendicular to the longitudinal direction relative to a cross sectional area of the small volume cell perpendicular to the longitudinal direction is from about 1.4 to about 2.4.

In manufacturing the honeycomb filter of the present embodiment, the honeycomb molded body is manufactured in the same manner as in the first embodiment of the present invention, except that the honeycomb molded body manufactured by extrusion molding is larger than and in a different outer shape from the honeycomb molded body described in the first embodiment of the present invention.

Other process is almost the same as the manufacturing of the honeycomb filter according to the first embodiment of the present invention. However, since the honeycomb structure forming the honeycomb filter has a single honeycomb fired body in the present embodiment, bonding is not necessary. Moreover, when a honeycomb molded body in a substantially round pillar shape is manufactured, the periphery cutting is not necessary.

The thus manufactured honeycomb filter may be used for a urea SCR device.

The honeycomb filter of the present embodiment can exert the same effects as the effects (1) to (4) according to the first embodiment of the present invention.

Other Embodiments

The thickness of the cell wall of the honeycomb structure (honeycomb fired body) forming the honeycomb filter according to the embodiments of the present invention is not particularly limited, and is preferably from about 0.2 mm to about 0.4 mm.

When the thickness of the cell wall of the honeycomb structure (honeycomb fired body) is from about 0.2 mm to about 0.4 mm, NOx tends to be sufficiently converted. Moreover, the strength of the honeycomb filter tends to be sufficiently increased.

The thickness of about 0.4 mm or less is less likely to cause an increase in pressure loss.

The cell density on a cross section perpendicular to the longitudinal direction of the honeycomb filter is not particularly limited. A desirable lower limit is about 31 pcs/cm$^2$ (about 200 pcs/in$^2$) and a desirable upper limit is about 93 pcs/cm$^2$ (about 600 pcs/in$^2$). A more desirable lower limit is about 46.5 pcs/cm$^2$ (about 300 pcs/in$^2$) and a more desirable upper limit is about 62 pcs/cm$^2$ (about 400 pcs/in$^2$).

The cell density of the honeycomb filter in a range of from about 31 pcs/cm$^2$ to about 93 pcs/cm$^2$ tends to improve the NOx conversion rate.

The shape of the honeycomb filter is not limited to a substantially round pillar shape, and may be optional pillar shapes such as a substantially cylindroid shape and a substantially polygonal pillar shape.

The average pore diameter of the honeycomb fired body forming the aggregated honeycomb structure and the average pore diameter of the integral honeycomb structure are preferably from about 5 μm to about 30 μm.

When the average pore diameter is about 5 μm or more, clogging of the pores with particulates is less likely to occur. When the average pore diameter is 30 μm or less, particulates are less likely to pass through the pores and are likely to be captured. Therefore the honeycomb structure tends to surely function as a filter.

The particle diameter of the ceramic powder to be used in manufacturing the honeycomb fired bodies forming the aggregated honeycomb structure and the integral honeycomb structure is not particularly limited, and the ceramic powder that tends not to cause the case where the size of the honeycomb fired body manufactured by the subsequent firing process becomes smaller than that of a degreased honeycomb molded body manufactured through the degreasing is preferable. A powder including a combination of 100 parts by weight of powder having an average particle diameter of from about 1.0 μm to about 50 μm, and from about 5 parts by weight to about 65 parts by weight of powder having an average particle diameter of from about 0.1 μm to about 1.0 μm is preferable.

The organic binder in the wet mixture to be used in manufacturing the honeycomb fired bodies forming the aggregated honeycomb structure and the integral honeycomb structure is not particularly limited, and examples thereof include methyl cellulose, carboxymethyl cellulose, hydroxyethyl cellulose, polyethylene glycol, and the like. Methylcellulose is preferable among the above examples. In general, the blending amount of the organic binder is desirably from about 1 part by weight to about 10 parts by weight with respect to 100 parts by weight of the ceramic powder.

The plasticizer to be contained in the wet mixture is not particularly limited, and examples thereof include glycerin or the like as mentioned earlier.

Also, the lubricant to be contained in the wet mixture is not limited, and examples thereof include polyoxy alkylene-based compounds such as polyoxyethylene alkyl ether and polyoxypropylene alkyl ether, and the like.

Specific examples of the lubricant include polyoxyethylene monobutyl ether, polyoxypropylene monobutyl ether, and the like.

Here, the plasticizer and the lubricant are not necessarily contained in the wet mixture depending on cases.

Upon preparing the wet mixture, a dispersant solution may be used, and examples of the dispersant solution include water, an organic solvent such as benzene, alcohol such as methanol, and the like.

Moreover, a molding auxiliary may be added to the wet mixture.

The molding auxiliary is not particularly limited, and examples thereof include ethylene glycol, dextrin, fatty acid, fatty acid soap, polyalcohol, and the like.

Furthermore, balloons that are fine hollow spheres including an oxide based ceramic, or spherical acrylic particles, graphite or the like may be optionally added to the wet mixture.

The balloons are not particularly limited, and examples thereof include, alumina balloons, glass micro-balloons, shirasu balloons, fly ash balloons (FA balloons), mullite balloons, and the like. Out of these, alumina balloons are more desirably used.

The zeolite may be supported on a honeycomb structure as mentioned earlier or may be supported on a honeycomb fired body.

In manufacturing of an aggregated honeycomb structure, an aggregated honeycomb structure can be manufactured by allowing the honeycomb fired bodies to support zeolite as mentioned earlier and then combining the honeycomb fired bodies supporting zeolite with one another with the adhesive layer interposed therebetween.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb filter comprising:
   a honeycomb structure comprising:
      silicon carbide; and
      cell walls having a porosity of about 55% to about 65% and extending along a longitudinal direction of the honeycomb structure to define cells between the cell walls, each of the cells being sealed at either end of the cells; and
   a zeolite supported on the cell walls of the honeycomb structure, an amount of the zeolite supported on the cell walls being from about 80 g/L to about 150 g/L, a thermal conductivity of a combination of the cell walls and the zeolite supported therein being about 3 W/mK or more,
   wherein the honeycomb filter has both a function of a catalyst carrier of a urea SCR device and a function of a DPF.

2. The honeycomb filter according to claim 1, wherein the thermal conductivity is about 3.2 W/mK or more.

3. The honeycomb filter according to claim 2, wherein the thermal conductivity is from about 5 W/mK to about 10 W/mK.

4. The honeycomb filter according to claim 3, wherein the thermal conductivity is from about 5.1 W/mK to about 10.0 W/mK.

5. The honeycomb filter according to claim 1, wherein the cells comprise a large volume cell and a small volume cell, and an area ratio of a cross sectional area of the large volume cell perpendicular to the longitudinal direction relative to a cross sectional area of the small volume cell perpendicular to the longitudinal direction is from about 1.4 to about 2.4.

6. The honeycomb filter according to claim 5, wherein a cross section of the large volume cell perpendicular to the longitudinal direction has a substantially octagonal shape, and a cross section of the small volume cell perpendicular to the longitudinal direction has a substantially quadrangular shape.

7. The honeycomb filter according to claim 5, wherein a cross section of the large volume cell perpendicular to the longitudinal direction has a substantially quadrangular shape, and a cross section of the small volume cell perpendicular to the longitudinal direction has a substantially quadrangular shape.

8. The honeycomb filter according to claim 1, wherein the zeolite comprises at least one of β-type zeolite, Y-type zeolite, ferrierite, ZSM-5 type zeolite, mordenite, faujasite, A-type zeolite, L-type zeolite, SAPO, and MeAPO.

9. The honeycomb filter according to claim 8, wherein the zeolite comprises at least one of a β-type zeolite, a ZSM-5 type zeolite, and a SAPO.

10. The honeycomb filter according to claim 9, wherein the SAPO comprises at least one of SAPO-5, SAPO-11, and SAPO-34.

11. The honeycomb filter according to claim 10, wherein the SAPO comprises SAPO-34.

12. The honeycomb filter according to claim 8, wherein the MeAPO comprises MeAPO-34.

13. The honeycomb filter according to claim 1, wherein the zeolite is ion-exchanged with metal ions.

14. The honeycomb filter according to claim 13, wherein the metal ions comprise at least one of a copper ion, an iron ion, a nickel ion, a zinc ion, a manganese ion, a cobalt ion, a silver ion, and a vanadium ion.

15. The honeycomb filter according to claim 14, wherein the zeolite is ion-exchanged with at least one of a copper ion and an iron ion.

16. The honeycomb filter according to claim 1, wherein the honeycomb structure comprises a plurality of honeycomb fired bodies combined with one another with an adhesive layer interposed between the plurality of honeycomb fired bodies.

17. The honeycomb filter according to claim 1, further comprising:
   a coat layer formed on a periphery of the honeycomb structure.

18. The honeycomb filter according to claim 1, wherein the honeycomb structure comprises a single honeycomb fired body.

19. The honeycomb filter according to claim 1, wherein the honeycomb filter is so constructed as to be used as a urea SCR device.

20. A urea SCR device comprising
   a honeycomb filter placed in a casing, the honeycomb filter comprising:
      a honeycomb structure comprising cell walls having a porosity of about 55% to about 65% and extending along a longitudinal direction of the honeycomb structure to define cells between the cell walls, each of the cells being sealed at either end of the cells; and
      a zeolite supported on the cell walls of the honeycomb structure, an amount of the zeolite supported on the cell walls being from about 80 g/L to about 150 g/L, a thermal conductivity of a combination of the cell walls and the zeolite supported therein being about 3 W/mK or more, wherein the honeycomb filter has both a function of a catalyst carrier of a urea SCR device and a function of a DPF.

21. The urea SCR device according to claim 20, wherein the thermal conductivity is about 3.2 W/mK or more.

22. The urea SCR device according to claim 21, wherein the thermal conductivity is from about 5 W/mK to about 10 W/mK.

23. The urea SCR device according to claim 22, wherein the thermal conductivity is from about 5.1 W/mK to about 10.0 W/mK.

24. The urea SCR device according to claim 20, wherein the cells include a large volume cell and a small volume cell, and an area ratio of a cross sectional area of the large volume cell perpendicular to the longitudinal direction relative to a cross sectional area of the small volume cell perpendicular to the longitudinal direction is from about 1.4 to about 2.4.

25. The urea SCR device according to claim 24, wherein a cross section of the large volume cell perpendicular to the longitudinal direction has a substantially octagonal shape, and a cross section of the small volume cell perpendicular to the longitudinal direction has a substantially quadrangular shape.

26. The urea SCR device according to claim 24, wherein a cross section of the large volume cell perpendicular to the longitudinal direction has a substantially quadrangular shape, and a cross section of the small volume cell perpendicular to the longitudinal direction has a substantially quadrangular shape.

27. The urea SCR device according to claim 24, wherein the honeycomb filter is placed in the casing such that inlet-side cells to introduce exhaust gases comprise large volume cells while outlet-side cells to discharge exhaust gases comprise small volume cells.

28. The urea SCR device according to claim 20, wherein the zeolite comprises at least one of β-type zeolite, Y-type zeolite, ferrierite, ZSM-5 type zeolite, mordenite, faujasite, A-type zeolite, L-type zeolite, SAPO, and MeAPO.

29. The urea SCR device according to claim 28, wherein the zeolite comprises at least one of a β-type zeolite, a ZSM-5 type zeolite, and a SAPO.

30. The urea SCR device according to claim 29, wherein the SAPO comprises at least one of SAPO-5, SAPO-11, and SAPO-34.

31. The urea SCR device according to claim 30, wherein the SAPO comprises SAPO-34.

32. The urea SCR device according to claim 28, wherein the MeAPO comprises MeAPO-34.

33. The urea SCR device according to claim 20, wherein the zeolite is ion-exchanged with metal ions.

34. The urea SCR device according to claim 33, wherein the metal ions comprise at least one of a copper ion, an iron ion, a nickel ion, a zinc ion, a manganese ion, a cobalt ion, a silver ion, and a vanadium ion.

35. The urea SCR device according to claim 34, wherein the zeolite is ion-exchanged with at least one of a copper ion and an iron ion.

36. The urea SCR device according to claim 20, wherein the honeycomb structure comprises a plurality of honeycomb fired bodies combined with one another with an adhesive layer interposed between the plurality of honeycomb fired bodies.

37. The urea SCR device according to claim 20, wherein the honeycomb filter further comprises a coat layer formed on a periphery of the honeycomb structure.

38. The urea SCR device according to claim 20, wherein the honeycomb structure comprises a single honeycomb fired body.

39. The urea SCR device according to claim 20, further comprising a urea spray nozzle for spraying urea water into exhaust gases on an upstream side of the honeycomb filter.

40. A method of manufacturing a urea SCR device, said method comprising:

forming a honeycomb filter comprising:

a honeycomb structure comprising cell walls having a porosity of about 55% to about 65% and extending along a longitudinal direction of the honeycomb structure to define cells between the cell walls, each of the cells being sealed at either end of the cells; and a zeolite supported on the cell walls of the honeycomb structure, an amount of the zeolite supported on the cell walls being from about 80 g/L to about 150 g/L, a thermal conductivity of a combination of the cell walls and the zeolite supported therein being about 3 W/mK or more, wherein the honeycomb filter has both a function of a catalyst carrier of a urea SCR device and a function of a DPF; and placing the honeycomb filter in a casing, wherein the zeolite is supported on the cell walls by dipping the honeycomb structure into a zeolite slurry, drying the dipped honeycomb structure, firing the dried honeycomb structure, and repeating the dipping, drying and firing until the amount of the zeolite supported on the cell walls is from about 80 g/L to about 150 g/L.

* * * * *